(12) United States Patent
Ilincic et al.

(10) Patent No.: US 12,216,757 B2
(45) Date of Patent: *Feb. 4, 2025

(54) SYSTEMS AND METHODS FOR PASSWORD MANAGERS

(71) Applicant: Capital One Services, LLC, McLean, VA (US)

(72) Inventors: Rajko Ilincic, Annandale, VA (US); Jeffrey Rule, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,019

(22) Filed: Jan. 29, 2024

(65) Prior Publication Data

US 2024/0241941 A1     Jul. 18, 2024

Related U.S. Application Data

(63) Continuation of application No. 17/307,819, filed on May 4, 2021, now Pat. No. 11,921,840, which is a continuation of application No. 16/773,023, filed on Jan. 27, 2020, now Pat. No. 11,030,299.

(51) Int. Cl.
*G06F 21/45* (2013.01)
*G06F 21/60* (2013.01)
*H04L 9/40* (2022.01)

(52) U.S. Cl.
CPC ............ *G06F 21/45* (2013.01); *G06F 21/602* (2013.01); *H04L 63/083* (2013.01); *H04L 63/0853* (2013.01); *H04L 63/0861* (2013.01); *H04L 63/101* (2013.01)

(58) Field of Classification Search
CPC .............. H04L 63/0853; H04L 63/101; H04L 63/0861; H04L 63/083; G06F 21/45; G06F 21/602
USPC ............................................................ 726/6
See application file for complete search history.

(56) References Cited

U.S. PATENT DOCUMENTS

| | | | |
|---|---|---|---|
| 6,907,546 B1 | 6/2005 | Haswell et al. | |
| 7,100,195 B1 | 8/2006 | Underwood | |
| 7,519,688 B2 * | 4/2009 | Behrens | H04L 67/02 709/227 |
| 8,056,118 B2 | 11/2011 | Pillouras | |
| 8,065,219 B2 | 11/2011 | Haynie et al. | |

(Continued)

*Primary Examiner* — Amare F Tabor
(74) *Attorney, Agent, or Firm* — HUNTON ANDREWS KURTH LLP

(57) ABSTRACT

An authentication system comprises a browser extension and a password manager application. The browser extension can be configured for execution on a first user device. The browser extension can be configured to display a response code and receive a login credential from a server. The response code can comprise a unique session identifier identifying the browser extension and a user browsing session. The password manager application can be configured for execution on a second user device. The second user device can have a scanner configured to scan the response code. The password manager application can be configured to extract the unique session identifier, parse the unique session identifier into session identifier content, send a portion of the session identifier content to the server, receive an approval from a user of the second user device, and send a notification to the server.

21 Claims, 5 Drawing Sheets

(56) References Cited

U.S. PATENT DOCUMENTS

| | | | |
|---|---|---|---|
| 8,132,243 B2* | 3/2012 | Bychkov | G06F 21/33 |
| | | | 455/418 |
| 8,213,906 B2 | 7/2012 | Chen | |
| 8,381,269 B2* | 2/2013 | Yue | H04L 63/083 |
| | | | 709/217 |
| 8,590,022 B2 | 11/2013 | Faryna | |
| 8,613,070 B1 | 12/2013 | Borzycki et al. | |
| 8,683,571 B2* | 3/2014 | Zapata | G06F 21/43 |
| | | | 713/153 |
| 8,726,343 B1 | 5/2014 | Borzycki et al. | |
| 8,844,003 B1 | 9/2014 | Jakobsson | |
| 8,918,479 B2* | 12/2014 | O'Connell | G06F 21/55 |
| | | | 709/227 |
| 8,949,938 B2 | 2/2015 | Sowatskey et al. | |
| 8,959,583 B2 | 2/2015 | Fadida et al. | |
| 8,959,628 B2 | 2/2015 | Coppock | |
| 8,997,195 B1 | 3/2015 | Fadida et al. | |
| 9,065,824 B1 | 6/2015 | Valdivia | |
| 9,203,824 B1* | 12/2015 | Nunn | G06F 21/31 |
| 9,224,003 B2* | 12/2015 | Andersen | H04L 67/1097 |
| 9,235,696 B1 | 1/2016 | Nien et al. | |
| 9,280,670 B2* | 3/2016 | Conte | G06F 21/6245 |
| 9,412,283 B2* | 8/2016 | Bhatnagar | H04L 9/3228 |
| 9,419,968 B1 | 8/2016 | Pei et al. | |
| 9,479,499 B2 | 10/2016 | Wang | |
| 9,525,667 B2 | 12/2016 | Wang | |
| 9,825,947 B2 | 11/2017 | Jass et al. | |
| 9,887,979 B1 | 2/2018 | Pandita et al. | |
| 9,979,725 B1 | 5/2018 | Liu et al. | |
| 10,204,327 B2 | 2/2019 | Katzin | |
| 10,304,026 B2 | 5/2019 | Smith et al. | |
| 10,491,587 B2 | 11/2019 | Hon et al. | |
| 10,719,602 B2* | 7/2020 | Fang | H04L 9/0643 |
| 2011/0145150 A1 | 6/2011 | Onischuk | |
| 2013/0067217 A1 | 3/2013 | Matzkel et al. | |
| 2013/0167208 A1 | 6/2013 | Shi | |
| 2013/0198814 A1 | 8/2013 | Zheng et al. | |
| 2014/0223525 A1* | 8/2014 | Fadida | G06F 21/35 |
| | | | 726/6 |
| 2014/0237563 A1 | 8/2014 | Zhang | |
| 2014/0250511 A1 | 9/2014 | Kendall | |
| 2015/0067772 A1 | 3/2015 | Paek et al. | |
| 2015/0121491 A1 | 4/2015 | Xia | |
| 2015/0271167 A1 | 9/2015 | Kalai | |
| 2015/0339788 A1 | 11/2015 | Dawson | |
| 2016/0006711 A1 | 1/2016 | Gage et al. | |
| 2016/0020905 A1 | 1/2016 | Poole et al. | |
| 2016/0173481 A1 | 6/2016 | Kwon et al. | |
| 2016/0191506 A1 | 6/2016 | Wang | |
| 2016/0337553 A1 | 11/2016 | Sato | |
| 2017/0171200 A1 | 6/2017 | Bao et al. | |
| 2017/0185761 A1 | 6/2017 | Stanwood et al. | |
| 2017/0230366 A1 | 8/2017 | Liang et al. | |
| 2017/0237726 A1 | 8/2017 | Wang | |
| 2018/0004935 A1 | 1/2018 | Slegrist | |
| 2018/0041508 A1 | 2/2018 | Jass et al. | |
| 2019/0066063 A1 | 2/2019 | Jessamine | |

\* cited by examiner

SYSTEMS AND METHODS FOR PASSWORD MANAGERS

CROSS-REFERENCE TO RELATED APPLICATION

The subject application is a Continuation of Ser. No. 17/307,819 filed May 4, 2021, which is a Continuation of Ser. No. 16/773,023 filed Jan. 27, 2020, now U.S. Pat. No. 11,030,299, the complete disclosures of which are incorporated herein by reference in their entireties.

FIELD OF THE INVENTION

The present disclosure generally relates to network security, access control, and authentication and, in particular, to systems and methods for password managers.

BACKGROUND

When using computers, mobile phones, tablets and other devices, most users are forced to create many login accounts secured with passwords for work, personal business, shopping, banking and other ordinary tasks. Many users have trouble remembering all their account login information. Some users have tried using the simplest possible passwords, things that are easy to remember, like "12345678" or "password." Others users have tried to memorize one ultra-secure password and then use it for everything, but hackers know this, so they take passwords from one breached site and then try them on other sites. Still other users have tried password managers.

Password managers are programs that keep all of a user's log-in details in a virtual safe-deposit box that is secured by a master password and encryption. However, even master passwords on password managers have been exposed. There is also a security concern with password managers because users of password managers have all their passwords stored in one place. Thus, if someone breaks into the password manager, they would have access to all of the user's sensitive data and that would pose a huge risk; no one wants to wake up to empty bank accounts and being locked out of their own digital life. The same might happen if the master password—the only password that users need to remember—is lost, as these services usually can't recover the master key for security reasons.

Even with password managers, user login accounts are vulnerable to malware such as keylogging. A keylogger is a program that cybercriminals can install on a device to monitor and record a user's keystrokes. Cybercriminals can install a keylogger when a user clicks on a link or opens an attachment from a phishing mail or when the user visits a malicious website. In the hands of a hacker or a cybercriminal, a keylogger is a potent tool to steal the user's private and sensitive information. This gives hackers the benefit of access to PIN codes and account numbers, passwords to online shopping sites, email ids, email logins, and other confidential information. Once hackers get access to the user's private and sensitive information, they can take advantage of the hacked data and, for example, steal the user's identity or perform online money transactions using the user's account.

Accordingly, there is a need for improvements in network security, access control, authentication, and password managers.

SUMMARY

The disclosed subject matter is directed to systems and methods for password managers that satisfy this need.

An example embodiment of the present disclosure can be a system comprising a browser extension and a password manager application. The browser extension can be configured for execution on a first user device. The browser extension can be configured to display a response code and receive login credentials from a server. The response code can comprise a unique session identifier identifying the browser extension and a user browsing session. The password manager application can be configured for execution on a second user device. The second user device can have a scanner configured to scan the response code. The password manager application can be configured to extract the unique session identifier, parse the unique session identifier into session identifier content, send a portion of the session identifier content to the server, receive an approval from a user of the second user device, and send a notification to the server. The approval can comprise a personal identification number (PIN) or a biometric. The login credentials can be stored on the second user device or the server. The response code can includes metadata and the password manager application can be further configured to validate the metadata. The notification can include the unique session identifier and the credentials.

An example embodiment of the present disclosure can be a method. A secure login option can be provided that is associated with a login on a website. The website can be displayed on a first user device and the login can be secured through a password manager application on a second user device. Upon selection of the secure login option, a unique session identifier can be generated and sent to a server. A code can be displayed on the first user device, where the code is scannable by the second user device and includes the unique session identifier. Credentials can be received for the login associated with the unique session identifier from the server. The login can be performed using the credentials. A whitelist can be received from the server, where the secure login option is available for the website because it is a member of the whitelist. The whitelist can be associated with the password manager application. The code can include metadata such as an IP address, a browser type, a request type, or a time stamp. The request type can include a security question associated with the password manager application on the second user device. A secure security question option can be provided. A security question code can be displayed on the first user device, where the security question code is scannable by the second user device and includes the unique session identifier. A security question answer can be received from the server, where the security question answer is associated with the password manager application on the second user device.

An example embodiment of the present disclosure can be a system, comprising a password manager, an authentication prompter, and a communicator. The password manager can manage credentials associated with a login on a website that is needed on a first user device. The password manager can be stored on a second user device. The authentication prompter can receive an authentication from the second user device. After receiving a scanned code associated with the login and including a unique session identifier, the communicator can send the credentials, the authentication and the unique session identifier to a server and the server can send the credentials to the first user device. The password manager can further comprise a whitelist manager that stores an approval of the website. The password manager can further comprise a cryptographer that encrypts the credentials. The encrypted credentials can be stored on the second user device or stored on the server. The scanned code can include metadata such as an IP address of the website, a browser type, or a time stamp. The communicator can send the metadata to the server. The scanned code can include an additional authentication request and the authentication prompter can receive an additional authentication from the second user device.

These and other features, aspects and advantages of the disclosed subject matter are explained in greater detail with reference to specific example embodiments that are illustrated in the following description, appended claims, and accompanying drawings.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
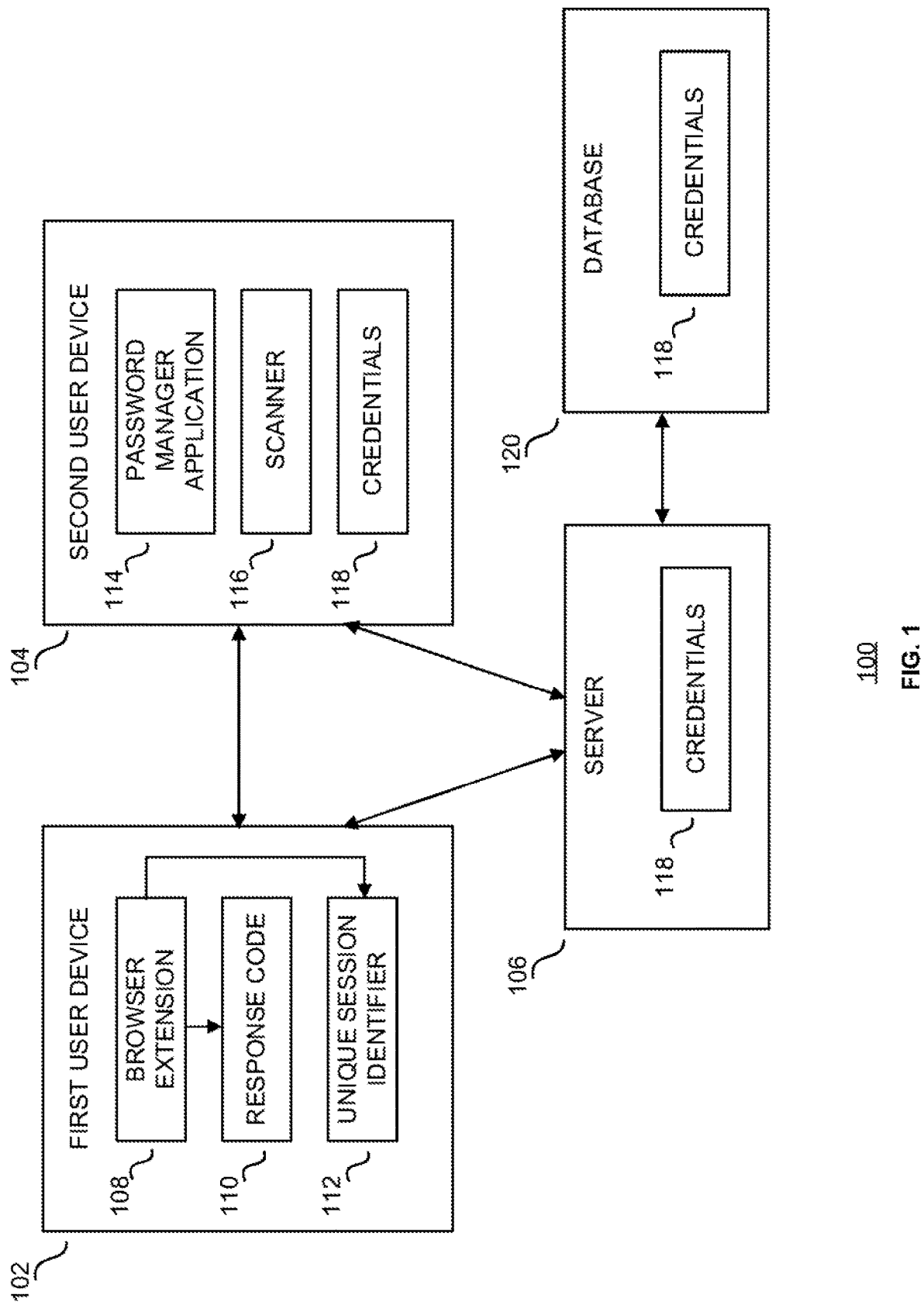
FIG. 1 is diagram of a system, according to an example embodiment of the disclosure.

FIG. 1 is diagram of a system 100, according to an example embodiment of the disclosure. The system 100 can include a first user device 102, a second user device 104, and a server 106, which can be network-enabled computers in data communication with each other. The system 100 can also include a database 120 in data communication with the server 106. The first user device 102 can include a browser extension 108, a response code 110, and a unique session identifier. The second user device 104 can include a password manager application 114, a scanner 116, and credentials 118. The server 106 and database 120 can also include credentials 118.

As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, a mobile device, or other device. For example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

In the system 100, a network-enabled computer such as the second user device 104 can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein.

In the system 100, a network-enabled computer such as the first user device 102 can include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user's device that is available and supported by the user's device, such as a touch-screen, keyboard, mouse, cursor-control device, touch-screen, microphone, digital camera, video recorder or camcorder. These devices can be used to enter information and interact with the software and other devices described herein. In some examples, the network-enabled computer can execute one or more applications, such as software applications, that enable, for example, network communications with one or more components of the system 100 and transmit and/or receive data.

In the system 100, a network-enabled computer can be a client device such as the first user device 102 and the second user device 104 in communication with one or more servers 106 via one or more networks, and can operate as a respective front-end to back-end pair with the server 104. A client device can transmit, for example from a mobile device application executing on the client device, one or more requests to the server 104. The one or more requests can be associated with retrieving data from the server 104. The server 104 can receive the one or more requests from the client device. Based on the one or more requests from the client device, the server 104 can be configured to retrieve the requested data from one or more databases 120. Based on receipt of the requested data from the one or more databases 120, the server 106 can be configured to transmit the received data to the client device. For example, the received data can be responsive to one or more requests.

The system 100 can include a network. The network can be one or more of a wireless network, a wired network or any combination of wireless network and wired network, and can be configured to connect the client device to the server 106. For example, the network can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

The network can include, without limitation, telephone lines, fiber optics, IEEE Ethernet 902.3, a wide area network, a wireless personal area network, a LAN, or a global network such as the Internet. The network 102 can support an Internet network, a wireless communication network, a cellular network, or the like, or any combination thereof. The network can further include one network, or any number of the exemplary types of networks mentioned above, operating as a stand-alone network or in cooperation with each other. The network can utilize one or more protocols of one or more network elements to which they are communicatively coupled. The network can translate to or from other protocols to one or more protocols of network devices. Although the network can be a single network, it should be appreciated that according to one or more examples, the network can comprise any number of interconnected networks, such as, for example, the Internet, a service provider's network, a cable television network, corporate networks, such as credit card association networks, and home networks.

The browser extension 108 can be implemented as a software module in any kind of browser such as Chrome®, Firefox®, Safari®, and Internet Explorer®. The browser extension 108 can be configured for execution on a first user device 102. The browser extension 108 can be integrated with other services on the first user device 102 such as Wi-Fi, email and messaging. The browser extension 108 can add features to the browser on the first user device 102 such as a secure login feature. The browser extension 108 can modify websites as they appear on the first user device 102 such as adding a secure login option.

The browser extension 108 can be configured to display a response code 110 and receive login credentials 122 from a server 106. The response code 110 can be a quick response code (QR code), a bar code, or any machine-readable or scannable optical code. The response code 110 can comprise a unique session identifier 112 identifying the browser extension 108 and a user browsing session. For example, the response code 110 can be generated using a QR code generator to include various data such as the unique session identifier 112, website address, device identifier, or other data.

An application programming interface (API) and software development kit (SDK), plugin, browser extension, a digital assistant such as Eno®, or other implementations may be used to provide the QR code login option. The SDK and/or API may be used in place of the browser extension 108 in system 100 to provide the same or similar functionality. The host of a website can provide the SDK/API plugin for a one-time QR code login option. The SDK functionality can facilitate a QR code login option on a third-party website with authentication on the password manager application 114 on the second user device 104. The QR code login option can be a button on the third-party website that uses the SDK/API, a browser extension, a stand-alone application, or other way to provide the interconnectivity and security desired.

The password manager application 114 can be configured for execution on a second user device 104. The password manager application 114 can interface with a browser on the first user device 102, the browser extension 108 on the first user device 102, and/or the server 106 to achieve secure login features such as automatically filling in information, without the user having to enter it, such as web forms, personal data, personal identification numbers (PINs), access codes, usernames, and passwords. In some examples, the password manager application 114 can function as a stand-alone application on the first user device 102, the second user device 104, and/or another device. In these examples, the password manager application 114 can function without interfacing with a browser. It is understood that the password manager can include all functionality described herein without interacting with a browser or being implemented as a browser extension.

The password manager application 114 can capture a number of login credentials for a user when the user logs in to websites or applications, when the user initially creates an account with the password manager application 114, when the user manually edits login credentials, when a user changes a username or password on a website or application, when a user imports information from another password manager, or other ways.

The password manager application 114 can rate or score the security of passwords and suggest ways to make them stronger. The password manager application 114 can generate secure login credentials for the user, display login credentials to the user and allow the user to edit them. The password manager application 114 can include two-factor or multi-factor authentication features such as biometric, fingerprint, facial recognition, voice recognition, or authentication codes.

The password manager application 114 can sync login credentials among various user devices using a cloud service or limit where the login credentials are used or stored. The login credentials 118 can be stored on the second user device 104, the server 106, or a database 120 that is accessible to the server 106. For example, the password manager application 114 can encrypt data locally and send it to the server 106 for storage. The password manager application 114 can present options to the user. For example, the user can choose to store data locally on the second user device 104. For example, the user can choose a cloud storage service provider such as Google Drive® or Dropbox®.

The password manager application 114 can facilitate secure sharing of login credentials such as sharing a work account or family account. The password manager application 114 can permit transferring digital legacy rights to another person, upon the death of the user or to a legal guardian. The password application 114 can support multiple identities for a user, such as a work identities and family identities.

In system 100, the second user device 104 can have a scanner 116 configured to scan the response code 110 displayed on the first user device 102. For example, a smartphone can use a QR code scanner to scan a QR code displayed on a desktop computer. For example, a smartphone can take a picture of the response code 110 on a retail terminal with a camera app. For example, a barcode scanning device connected to the second user device 104 can scan a barcode displayed on the first user device 102.

The response code can be generated to encode data that can be decoded after scanning. For example, the response code can encode the unique session identifier 112. The password manager application 114 can be configured to extract the unique session identifier 112 and parse the unique session identifier 112 into session identifier content. For example, session identifier content can include various data from network communications on a desktop computer as the user is attempting to login to a website. The password manager application 114 can send a portion of the session identifier content to the server 106.

The password manager application 114 can receive an approval from the user of the second user device 104. For example, the approval can be two-factor authentication by the user on a smartphone. The password manager application 114 can send a notification to the server 106. For example, the password manager application 114 can notify the server 106 that the user has been authenticated using a fingerprint. The approval can comprise a personal identification number (PIN) such as a four digit numeric code or a biometric such as TouchID® (fingerprint) or FaceID® (facial recognition) on an iPhone® or iPad®, for example.

The response code 110 can include metadata and the password manager application 114 can be further configured to validate the metadata. The notification can include the unique session identifier 112 and the credentials 118. For example, when the user attempts to login to a website on a desktop computer, the browser extension 108 can send session identification data to the server 106 and encode the session identification data in a QR code displayed on the desktop computer. When the user scans the QR code on a mobile phone and the password manager application 114 sends decoded session identification data from the QR code to the server 106, then the server can compare the session identification data from the browser extension with the decoded session identification data from the QR code to validate it.

For example, a user uses the password manager application 114 on a phone to automatically login to a website and authenticates with a PIN and biometrics. In order to not have to type in the login credentials, which could be intercepted by keyloggers, the user uses the password manager application 114 in sync with the server 106 and browser extension 108. The user can advantageously have more secure passwords since the user does not have to remember them or type them in manually. The server 106 can be part of a cloud service.

When the user is on a website where they need to provide login information and the browser extension 108 has stored login information for that website, the browser extension 108 can pop up a message saying that QR login is available. Upon acceptance by the user, the browser extension 108 can generate a unique session identification (ID) with the server 106 and tie it to the specific browser extension 108 and the current user browser session. The browser extension 108 can display a QR code that the user can scan with the phone. The user can scan the QR code, which can open the password manager application 114 and require the user to authenticate into the password manager application 114.

Once the user is authenticated, the password manager application 114 can contact the server 106 with the unique identifier that was read from the QR code and learn from it the website where the login is needed, what the IP is and any additional metadata for the login session that may be required. The password manager application 114 can determine if the user has login credentials available for that website and, if so, give the user a button to log into the website. Once the user clicks the button, the password manager application 114 can encrypt the data and send it to the server 106, which can route the encrypted data to the browser extension 108, where it can be decrypted. Once decrypted, the username and password can be populated into the fields by the browser extension 108. The user can click login and then be able to proceed to the website authenticated.

Figure 2:
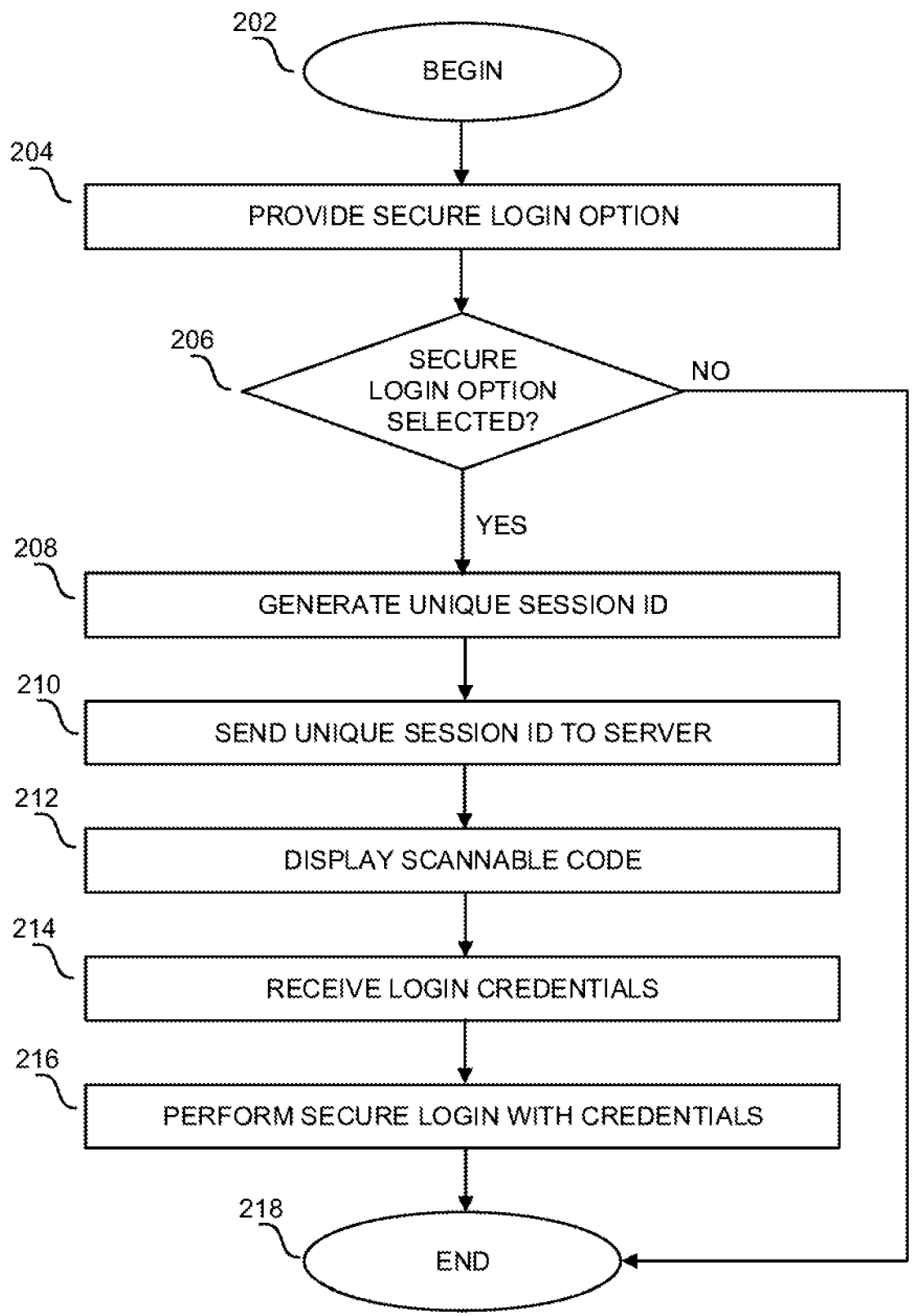
FIG. 2 is diagram of a method, according to an example embodiment of the disclosure.

FIG. 2 is diagram of a method 200, according to an example embodiment of the disclosure. The method 200 begins at block 202. At block 204, a secure login option can be provided that is associated with a login on a website. The website can be displayed on a first user device and the login can be secured through a password manager application on a second user device. At block 206, it is determined whether the secure login option is selected. If not selected, then the method 200 ends at block 218. Otherwise if the secure login option is selected, then at block 208, a unique session identifier can be generated and at block 210 sent to a server. At block 212, a code can be displayed on the first user device, where the code is scannable by the second user device and includes the unique session identifier. At block 214, credentials can be received for the login associated with the unique session identifier from the server. At block 216, the login can be performed using the credentials. At block 218, the method 200 ends.

For example, a one-time QR code on a laptop can establish a handshake and then the session can be authenticated on the user's phone. This avoids interception by keyloggers or a man-in-the-middle attack. The user can take their phone, scan a QR code, and not have to touch anything on the laptop, authorize with their phone, authenticate with their thumbprint and then the authentication session can happen in a backend server through the initial establishment of a handshake with the QR code. The QR code scanning can add security by requiring the user to be present at the device.

Figure 3:
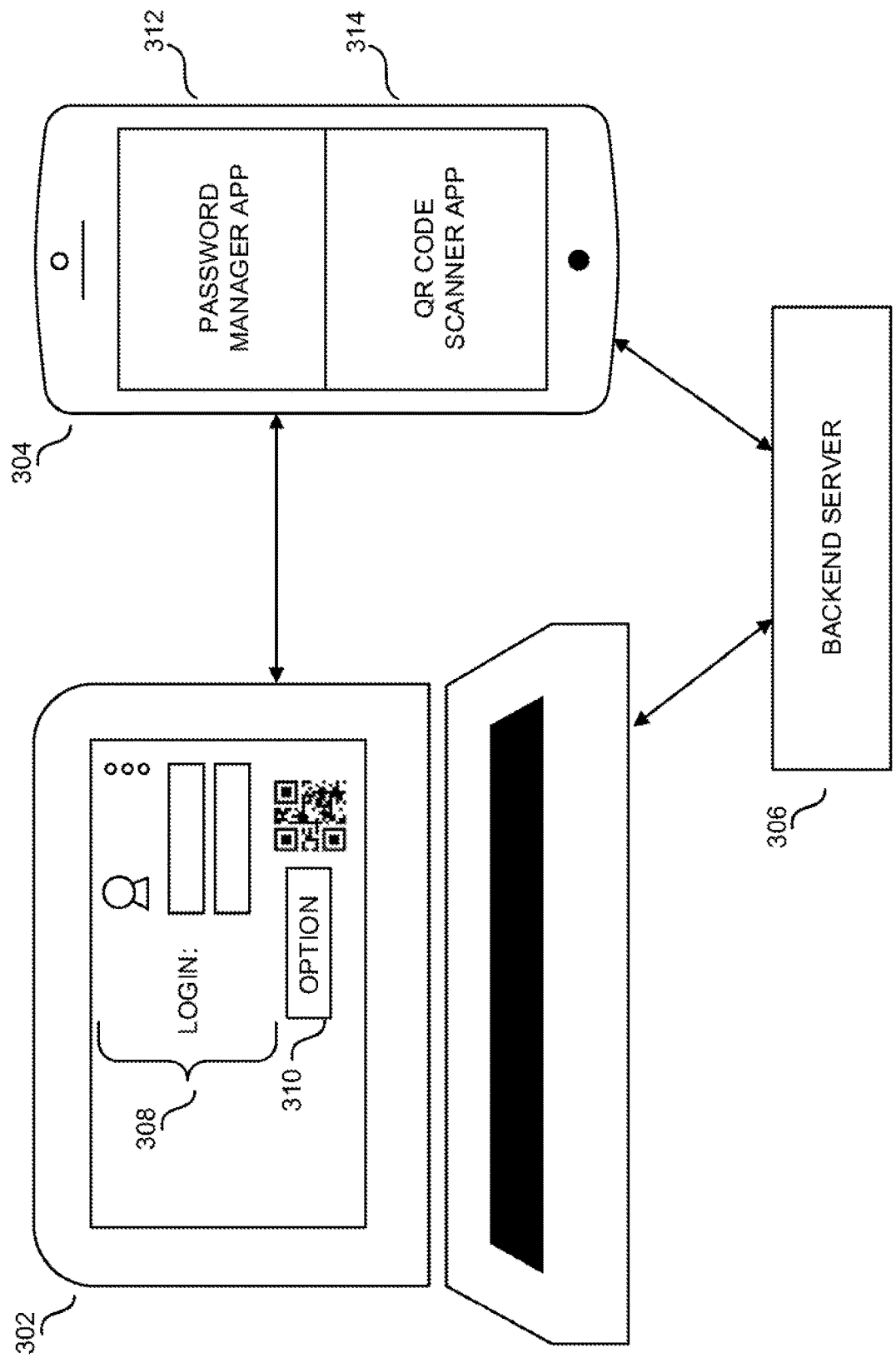
FIG. 3 is diagram of a system, according to an example embodiment of the disclosure.

FIG. 3 is diagram of a system 300, according to an example embodiment of the disclosure. The system 300 includes a laptop 302, a phone 304, and a backend server 306, which are networked-enabled computers in data communication on a network. The laptop 302 displays a website with login fields 308 and an option 310 to do a QR password manager mobile app login. The phone 304 includes a password manager app 312 and a QR code scanner app 314.

For example, the user can navigate in a browser on the laptop 302 to a website where the user needs to provide a user ID and password 308. The user can be provided with a button for the option to do a QR password manager mobile app login 310. This option 310 can be provided by the host website, a browser extension or a plugin. When the user selects the option 310, the user can use the password manager app 312 for authentication. The backend server 306 can generate a unique session ID and the browser extension can present the QR code on the screen of the laptop 302. The user can take their phone 304 and scan the QR code using the QR code scanner app 314, which can pass in the session ID and open the password manager mobile app 312 on their phone. Through the QR code, the password manager can notify the backend server 306 that there has been a request with this session ID to login to a site. The password manager mobile app 312 can ask the backend server 306 to find the credentials that match that session ID and site. The backend server 306 can securely send the credentials and the password manager mobile app 312 can automatically login the user so that the user sees the post-login screen.

The QR code, barcode, or other type of code can include metadata such as an IP address, a browser type, a request type, or a time stamp. The request type can include a security question associated with the password manager application on the second user device. For example, a secure security question option can be provided. A security question code can be displayed on the first user device, where the security question code is scannable by the second user device and includes the unique session identifier. A security question answer can be received from the server, where the security question answer is associated with the password manager application on the second user device.

System 300 can provide the QR password manager mobile app login through the interconnectivity of the laptop 302, backend server 306, and the phone 304. The portable password manager app 312 on the phone 304 allows a user to provide a secure handshake and avoid problems with keyboard loggers or man-in-the-middle attacks. A one-time QR code can be scanned by phone 304 to establish a handshake and then the backend server 306 can authenticate the session with the phone 304. This can reduce the likelihood that an attacker can harvest login credentials from the system 300. The user can scan a QR code on the laptop 302 without touching anything on the laptop and using the phone 304 to authenticate the session with the backend server 306. In this way, the user can be required to be present at the laptop 302 with the phone 304, providing additional security.

The user can select option 310 on the laptop 302, take their phone 304 and scan the QR code. The QR code can be decoded to pass a session ID and open the password manager app 312 on their phone 304. The password manager app 312 can communicate with the backend server 306 and get information such as the website that generated the session ID. The password manager app 312 can find the credentials that match the website and send them through the backend server 306 to the website server. With the session ID, the website can verify the login credentials for that session ID on the laptop 302 and then automatically login and show a post-login screen. The user can populate the password manager app 312 with login credentials for various websites on a whitelist of trusted websites.

After the user scans the QR code with their phone 304, the backend server 306 can validate the session ID and the website and check the whitelist of trusted websites. The backend server 306 can request authentication through the password manager app 312 on the user's phone 304. A notification on the password manager app 312 on the phone 304 could ask the user to approve the session login and the user can, for example, use a thumbprint to approve. Then, the password manager app 312 can match the website information to the login credentials stored on the phone 304 and send encrypted login credential information to the backend server 306. The backend server can push encrypted login credentials for this session ID to laptop 302. The laptop 302 can verify that the user is still on the same login page and populate the username and password field with the login credentials and automatically login the user.

Figure 4:
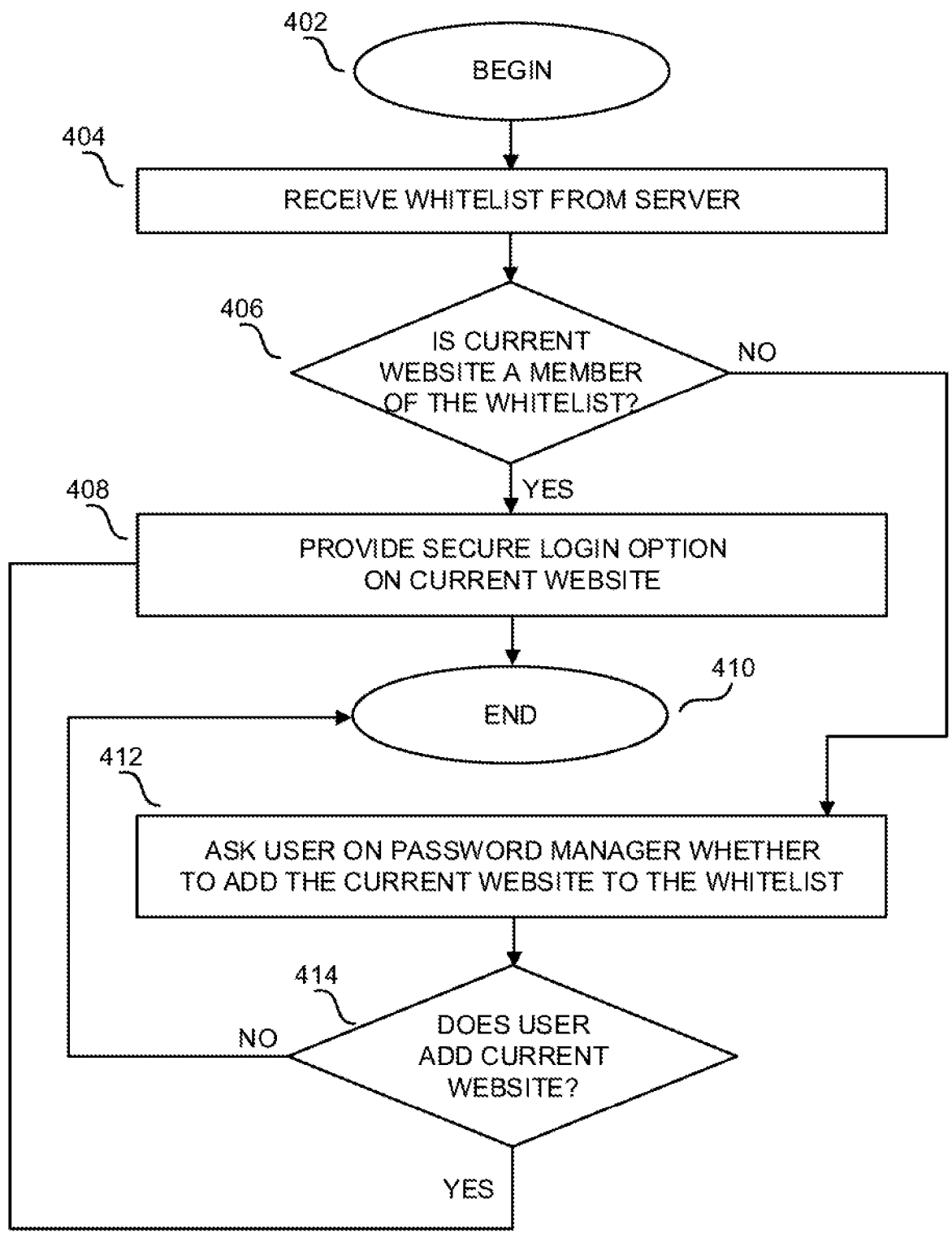
FIG. 4 is diagram of a method, according to an example embodiment of the disclosure.

FIG. 4 is diagram of a method 400, according to an example embodiment of the disclosure. The method 400 begins at block 402. At block 404, a whitelist can be received from the server. At block 406, it is determined whether the current website is a member of the whitelist. If the current website is a member of the whitelist, then at block 408 the secure login option is provided for the website and the method 400 ends at block 410. If not, at block 412 the user is asked on the password manager application whether to add the current website to the whitelist. If the user adds the current website to the whitelist, then at block 408 the secure login option is provided for the website and the method 400 ends at block 410. If the user does not add the current website, then the method 400 ends at block 410.

The whitelist can be associated with the password manager application. For example, a user can select websites to be members of the whitelist through an interface on the password manager application. For example, a browser extension can prompt the user to add a website to the whitelist when the user is attempting to login to the website. For example, a user can scan a QR code with their phone so that the password manager application opens up. The user can authenticate using the password manager application. The password manager application can decode the QR code to get the session ID and send the login request for a website and the session ID to a backend server. The backend server can determine that the website is on the whitelist, find the login credentials and send encrypted login credentials to the browser extension. The browser extension can decrypt the login credentials and automatically perform the secure login for the user.

Figure 5:
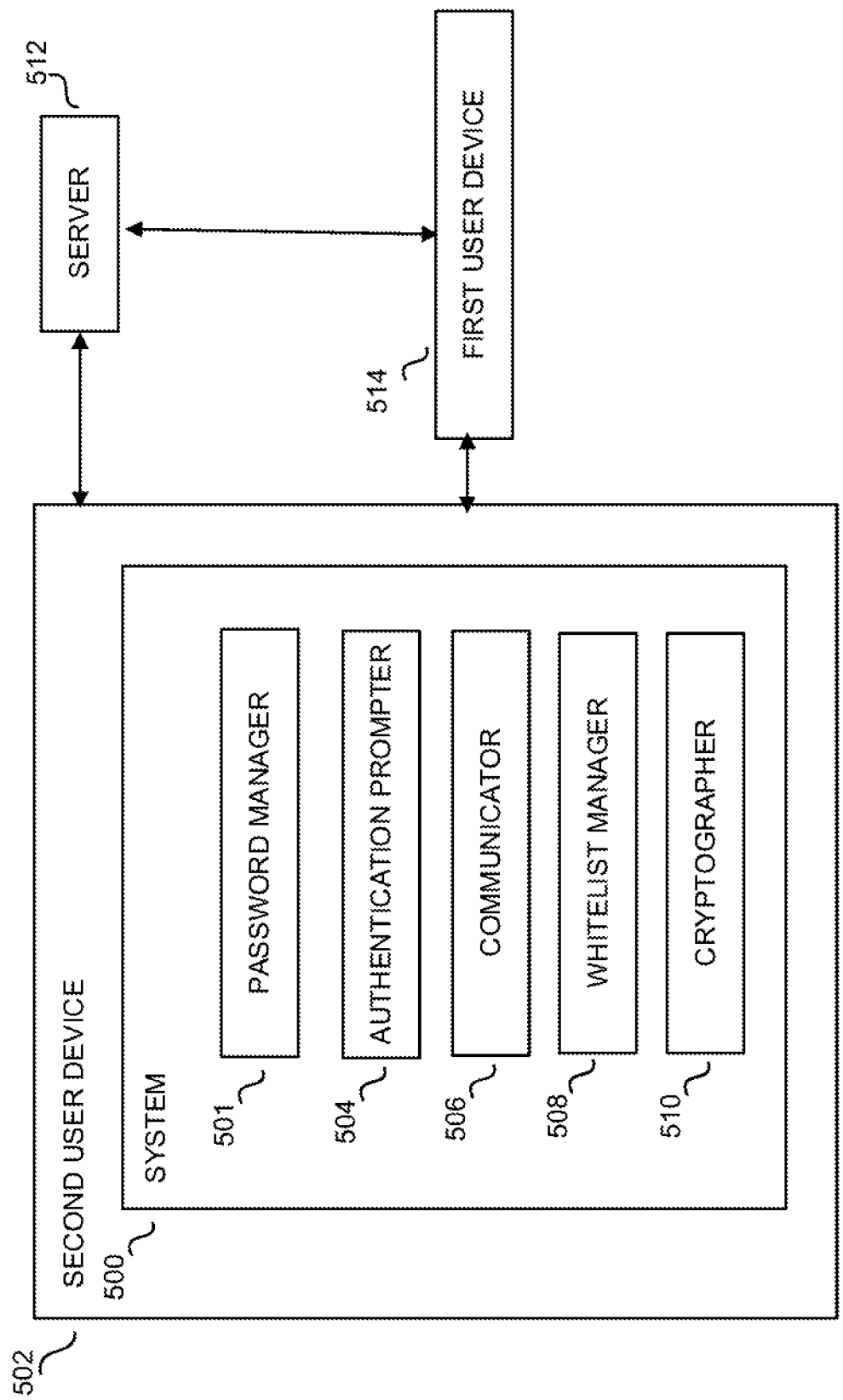
FIG. 5 is diagram of a system, according to an example embodiment of the disclosure.

FIG. 5 is diagram of a system 500, according to an example embodiment of the disclosure. The system 500 can comprise a password manager 501, an authentication prompter 504, and a communicator 506. The password manager 501 can manage credentials associated with a login on a website that is needed on a first user device 514. The password manager 501 can be stored on a second user device 502. The authentication prompter 504 can receive an authentication from the second user device 502. After receiving a scanned code associated with the login and including a unique session identifier, the communicator 506 can send the credentials, the authentication and the unique session identifier to a server 512 and the server 512 can send the credentials to the first user device 514. The password manager 501 can further comprise a whitelist manager 508 that stores an approval of the website. The password manager 501 can further comprise a cryptographer 510 that encrypts the credentials. The encrypted credentials can be stored on the second user device 502 or stored on the server 512. The scanned code can include metadata such as an IP address of the website, a browser type, or a time stamp. The communicator 506 can send the metadata to the server 512. The scanned code can include an additional authentication request and the authentication prompter 504 can receive an additional authentication from the second user device 502.

For example, a user can open the password manager 501 on the second user device 502 and enter login credentials that can be encrypted and saved on the server 512 or a cloud service. The password manager 501 can have a private key for encryption. The user can avoid typing login credentials into either the first user device 514 or the second user device 502 and the server 512 can securely provide the login credentials to the first user device 514.

For example, the scanned code can be a QR code with embedded metadata such as a browser type, an IP address, a time zone and so on. Additional metadata can make the handshake more secure so that it would be more difficult for a hacker to falsify requests to try to harvest the login credentials.

For example, the scanned code can include an additional authentication request such as a question, e.g., "What street did your best friend in high school live on?" Such additional authentication can be provided by the authentication prompter 504 on the second user device 502.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it could.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising a first user device including a browser extension and a second user device including a password manager application, wherein:
   the browser extension is configured to:
      display a code comprising metadata, the metadata including a unique session identifier, a security question, a device identifier, and a browser type identifier; and
      receive login credentials from a server; and
   the password manager application is configured to:
      receive the code;
      establish a handshake with the server based on the metadata;
      parse the unique session identifier into session identifier content;
      send the security question and a portion of the session identifier content to the server; and
      receive an approval from the server.

2. The system of claim 1, wherein the browser extension is further configured to encrypt the received login credentials with a private key.

3. The system of claim 1, wherein the password manager application is further configured to extract the unique session identifier and the security question.

4. The system of claim 1, wherein the password manager application is further configured to receive a security question answer from the server, and send a notification to the server, wherein the notification includes the unique session identifier and the login credentials.

5. The system of claim 1, wherein the unique session identifier identifies the browser extension and a user browsing session, and the browser extension is further configured to perform the login using the credentials.

6. The system of claim 1, wherein the approval comprises a personal identification number (PIN) or a biometric.

7. The system of claim 1, wherein the code comprises a bar code or a quick response code.

8. A method, comprising:
   receiving a secure login option for a login associated with a website, wherein the website is displayed on a first user device;
   generating a unique session identifier and sending the unique session identifier to a server;
   displaying a code on the first user device, wherein the code includes metadata comprising the unique session identifier, a security question, a device identifier, a browser type identifier, and a time zone identifier;
   establishing a handshake with the server based on the metadata;
   receiving credentials for the login associated with the unique session identifier from the server; and
   performing the login using the credentials.

9. The method of claim 8, wherein the login is secured through a password manager application on a second user device.

10. The method of claim 9, wherein the code is scannable by the second user device.

11. The method of claim 8, further comprising encrypting the credentials using a private key.

12. The method of claim 8, further comprising transmitting the metadata to the server to establish the handshake.

13. The method of claim 8, further comprising receiving a security question answer from the server, wherein the security question answer is associated with a password manager application.

14. The method of claim 8, wherein the unique session identifier identifies a browser extension and a user browsing session.

15. The method of claim 14, wherein the second user device includes a scanner configured to scan the code.

16. The method of claim 8, further comprising receiving a whitelist from the server, wherein the secure login option is available for the website because it is a member of the whitelist.

17. The method of claim 8, wherein the metadata includes at least one selected from the group of an IP address and a time stamp.

18. A non-transitory computer-accessible medium having stored thereon computer-executable instructions that, when executed by a computer arrangement, cause the computer arrangement to perform procedures comprising:
   receiving a secure login option for a login associated with a website, wherein the website is displayed on a first user device;
   generating a unique session identifier and sending the unique session identifier to a server;
   displaying a code on the first user device, wherein the code includes metadata comprising the unique session identifier, a security question, a device identifier, a browser type identifier, and a time zone identifier;
   establishing a handshake with the server based on the metadata;
   receiving credentials for the login associated with the unique session identifier from the server; and
   performing the login using the credentials.

19. The non-transitory computer-accessible medium of claim 18, the procedures further comprise receiving an approval, wherein the approval comprises a two-factor authentication.

20. The non-transitory computer-accessible medium of claim 18, the procedures further comprise receiving a security question answer and sending a notification to a server, wherein the notification includes the unique session identifier and the login credentials.

21. The method of claim 8, wherein establishing a handshake with the server is performed on a second user device.

\* \* \* \* \*